(12) United States Patent
Schumacher et al.

(10) Patent No.: US 10,579,801 B2
(45) Date of Patent: Mar. 3, 2020

(54) SELECTING AND LOADING FIRMWARE VOLUMES BASED ON LICENSE

(71) Applicant: HEWLETT PACKARD ENTERPRISE DEVELOPMENT LP, Houston, TX (US)

(72) Inventors: Derek Schumacher, Roseville, CA (US); Carey Huscroft, Roseville, CA (US); Terry Ping-Chung Lee, Roseville, CA (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 133 days.

(21) Appl. No.: 15/754,848

(22) PCT Filed: Sep. 23, 2015

(86) PCT No.: PCT/US2015/051623
§ 371 (c)(1),
(2) Date: Feb. 23, 2018

(87) PCT Pub. No.: WO2017/052528
PCT Pub. Date: Mar. 30, 2017

(65) Prior Publication Data
US 2018/0253555 A1    Sep. 6, 2018

(51) Int. Cl.
*G06F 9/00* (2006.01)
*G06F 15/177* (2006.01)
(Continued)

(52) U.S. Cl.
CPC ............ *G06F 21/572* (2013.01); *G06F 8/654* (2018.02); *G06F 9/4401* (2013.01);
(Continued)

(58) Field of Classification Search
None
See application file for complete search history.

(56) References Cited

U.S. PATENT DOCUMENTS 7,003,656 B2   2/2006  Chheda et al.
8,856,724 B2  10/2014  Somani et al.
(Continued)

FOREIGN PATENT DOCUMENTS

CN    104133678     11/2014
WO    WO-2011159892 12/2011

OTHER PUBLICATIONS

"Operating—System Structures," Chapter 2; http://www.wiley.com/college/sc/silberschatz/02.pdf; Oct. 20, 2004, 40 pages.
(Continued)

*Primary Examiner* — Nitin C Patel
(74) *Attorney, Agent, or Firm* — Hewlett Packard Enterprise Patent Department

(57) ABSTRACT

Examples disclosed herein relate to selecting and loading firmware volumes. A computing device is booted to a state where the computing device is capable of accessing a memory available to multiple other computing devices. The memory includes multiple firmware volumes. In one example, at least one firmware volume is selected based on a hardware configuration or hardware components of the computing device. The selected firmware volumes are loaded.

12 Claims, 4 Drawing Sheets

(51) Int. Cl.
  *G06F 21/57* (2013.01)
  *G06F 8/654* (2018.01)
  *G06F 9/4401* (2018.01)
  *G06F 9/445* (2018.01)

(52) U.S. Cl.
  CPC ........ *G06F 9/4408* (2013.01); *G06F 9/44505* (2013.01); *G06F 21/575* (2013.01)

(56) References Cited

U.S. PATENT DOCUMENTS

| | | | |
|---|---|---|---|
| 8,930,936 B2 | 1/2015 | Exton et al. | |
| 2003/0233536 A1* | 12/2003 | Chheda | G06F 9/4403 713/1 |
| 2004/0030883 A1* | 2/2004 | Munguia | G06F 9/441 713/100 |
| 2005/0060531 A1* | 3/2005 | Davis | G06F 9/4405 713/2 |
| 2005/0114687 A1 | 5/2005 | Zimmer et al. | |
| 2006/0136703 A1* | 6/2006 | Wisecup | G06F 9/4416 713/2 |
| 2007/0143589 A1* | 6/2007 | Rawe | G06F 9/441 713/2 |
| 2008/0189693 A1 | 8/2008 | Pathak | |
| 2014/0047428 A1 | 2/2014 | Prakash et al. | |
| 2015/0074815 A1 | 3/2015 | Huscroft et al. | |
| 2015/0095444 A1* | 4/2015 | Islam | G06F 9/4405 709/212 |
| 2015/0277937 A1* | 10/2015 | Swanson | G06F 9/4416 713/2 |

OTHER PUBLICATIONS

International Search Report & Written Opinion received in PCT Application No. PCT/US2015/051623, dated Jun. 8, 2016, 12 pages.

Souza, B. et al., "Open Source Tools for Java Deployment," May 2014, 5 pages, http://www.oracle.com/technetwork/articles/java/deployment-tools-2227133.html.

* cited by examiner

SELECTING AND LOADING FIRMWARE VOLUMES BASED ON LICENSE

CROSS-REFERENCE TO RELATED APPLICATIONS

This application is the National Stage of International Application No. PCT/US2015/051623, filed on Sep. 23, 2015, the content of which are incorporated herein by reference in its entirety.

BACKGROUND

Modern computers and computer-based systems include platform firmware or code representing instructions and non-instruction-type data stored on non-volatile "firmware" memory and used for initializing and/or for low-level functionality of the computer-based system. Traditionally, firmware for computing systems is compiled as a single monolithic image for that computing system. The code base in the monolithic image for the firmware for a computing system would include compilation of appropriate files for a given platform that the computing system uses and its supporting computer architecture.

BRIEF DESCRIPTION OF THE DRAWINGS

The following detailed description references the drawings, wherein.

DETAILED DESCRIPTION

Figure 1:
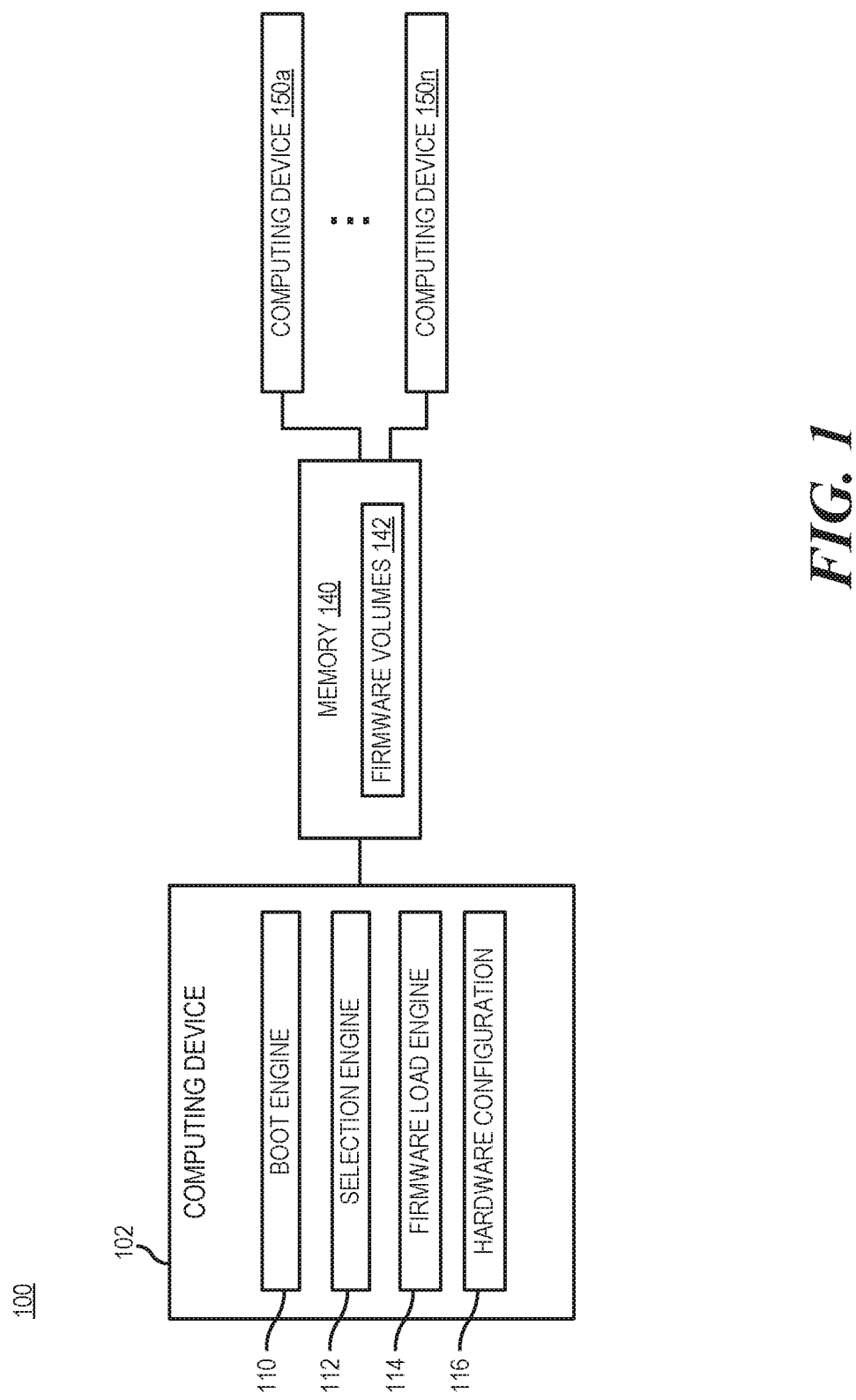
FIG. 1 is a block diagram of a computing system including a computing device capable of loading firmware volumes from a memory accessible by other computing devices, according to an example.

Modern System Firmware (SFW) implementations are built and deployed as a single, monolithic image created specifically to run on a specific hardware platform. While such implementations may come from code bases structured to support multiple platforms and/or architectures, deploying a monolithic image from such a code base to a system can cause challenges to efficiently supporting a heterogeneous mix of hardware and computer architectures. Further, with monolithic SFW images, it is challenging to support hardware for a specific role or a specific workload within an ecosystem where the same hardware configuration in the system is tasked differently.

To support a multitude of platform and central processing unit (CPU) architectures, a development team would typically structure its code base in a way that would enable compilation of the appropriate files for a given platform and its supported CPU architecture. Examples of CPU architecture include reduced instruction set computing (RISC) architecture and complex instruction set computing architecture (CISC) such as x86, x64, Advance RISC Machines, Microprocessor without Interlocked Pipeline Stages (MIPS), Precision Architecture RISC, Power architecture, scalable processor architecture, etc. Further, system boards may be available from various manufacturers to support the architectures. Moreover, the CPUs used by the respective system boards may be different. There is development efficiency gained with the approach, however in a system with a mix of hardware and CPU architectures, a different monolithic image would be needed per hardware instantiation.

Thus, there is an inefficiency of having to build and deploy a separate image to each different configuration of hardware in the system. An alternative to this approach would be to compile a single monolithic image to support any and all hardware configurations and take specific code paths by detecting which hardware the image is running on. However, as the system of mixed hardware grows, the potential size of such an image can become large and the performance of determining correct code paths can adversely affect boot times of the computing system and/or particular nodes of the computing system.

To configure hardware for a specific role and/or workload within the system, monolithic SFW images can either go through the build/deployment inefficiencies described above (building a specific image per role/workload), or support an ever-increasing number of tunable parameters and menu options for a user or administrator to choose from. The latter approach will then allow the user or administrator to set how specific portions of the SFW will execute and/or configure the platform.

Challenges with this approach are that the image size increases with every tunable parameter and selectable option underneath it because code is to be written to accommodate those. Further, the complexity for the user or administrator to know which selections to make in order to tune the system to a particular workload increases as well.

Management software can mitigate some of the complexity by deploying profiles to specific systems. The profiles can automate the setting of relevant options and/or parameters. However, using profiles on monolithic SFW images still has the inefficiency that if a new parameter is to additionally be supported, the entire image is updated and the new parameter set described to the management tool. Moreover, the monolithic image would traditionally reside locally on the computing system and be executed by the local computing system.

Accordingly, the SFW code base and the build/deployment environment can be structured in a way that isolates the SFW code into separate libraries or firmware volumes that can be deployed independently to hardware based on certain criteria, for example, the CPU architecture, a desired role/function of the device within the system, a workload to be executed on the device, combinations thereof, etc. Moreover, the firmware volumes can be stored in a location in a computing system that can be accessible to multiple computing devices of the system. This way, the respective device(s) can pull the firmware volumes and/or a manager of the system can push the firmware volumes down to the respective devices. As used herein firmware is software that can be executed by hardware to provide low-level control of a device. Firmware may be used to provide an interface and/or services to higher-level software, such as an operating system. In one example, a firmware volume can be compiled and each variation of settings of the corresponding firmware library can be set using separate data information.

In another example, separate firmware volumes can be compiled for different settings.

As used herein a "firmware device" is a persistent (e.g., non-volatile) physical repository that includes firmware code and/or data. Moreover, as used herein, a "firmware volume" is a logical firmware device. Examples of how a firmware volume can be implemented are included in the Platform Initialization Specification from the Unified Extensible Firmware Interface forum.

A firmware volume or set of firmware volumes can be located on the device and can include boot reset vector code and early crawl-out code. The firmware volume can be placed in a Read Only Memory (ROM) or another approach can be used to utilize the firmware volume, for example, a hardware assist to map a portion of nonvolatile memory into a CPU's address space. In some examples, the firmware volume can also include code to access and/or map a non-volatile memory so that additional firmware volumes can be mapped.

Other SFW modules can be organized and grouped into the other firmware volumes based on criteria. One criteria used can include the hardware used in the device (e.g., processor type, specific revision of hardware design, etc.). Another criteria can include security (e.g., separating security-sensitive SFW modules into separate firmware volumes). A further criteria can include a license (e.g., some SFW modules may be available if a license is present). Moreover, another criteria can include updatability, for example, a SFW can be separated if it can be updated and/or applied without reboot from those that require a reboot to take effect. In some examples, the boot firmware from the boot firmware volume can discover the additional firmware volumes, determine which firmware volumes are relevant (e.g., determine whether the firmware volume matches a correct hardware), and dispatch the SFW modules in the additional firmware volumes.

In a system comprising of multiple machines or "nodes," SFW libraries can be deployed using firmware volumes according to the specifics of the node that the firmware is being deployed. For example, a node with an ×64 CPU could use a set of SFW volumes that configure the ×64 processors for use within the system. In another example, a node with particular security provisions could use a set of SFW volumes including the security provisions. In yet another example, a node or set of nodes may support a real-time or low-latency application suite. SFW volumes with a low runtime execution profile may be used in this case.

To use multiple SFW volumes on particular nodes, the SFW volumes can be matched with the hardware of the respective nodes and/or a profile as further described herein. In one example, the SFW volumes can be placed at predetermined offsets within the SFW image space on the node based on their relative location within the SFW execution flow. In another example, wrappers can be placed around the firmware volumes or a table, list, or filesystem may be constructed to allow more flexibility for placement.

Moreover, updating the SFW volumes with fixes and/or enhancements could be accomplished by allowing the relevant node(s) (e.g., the nodes using the respective SFW volume) pull down or directly execute the updated SFW volume when a change occurs. This can further avoid the overhead of sending a large monolithic image to each affected node. In one example, the location of the SFW volume that was changed could be stored in a mapfile, a table, a list, a filesystem, etc. for the deploying component to parse. In one example, the update can be accomplished using an in-place replacement. In another example, the update can be accomplished using a mechanism to support an along-side replacement in order to keep a copy of the previous version of the SFW volume. With this approach, a presumably working copy of a compatible firmware volume is saved in case a rollback is to be used.

Figure 2:
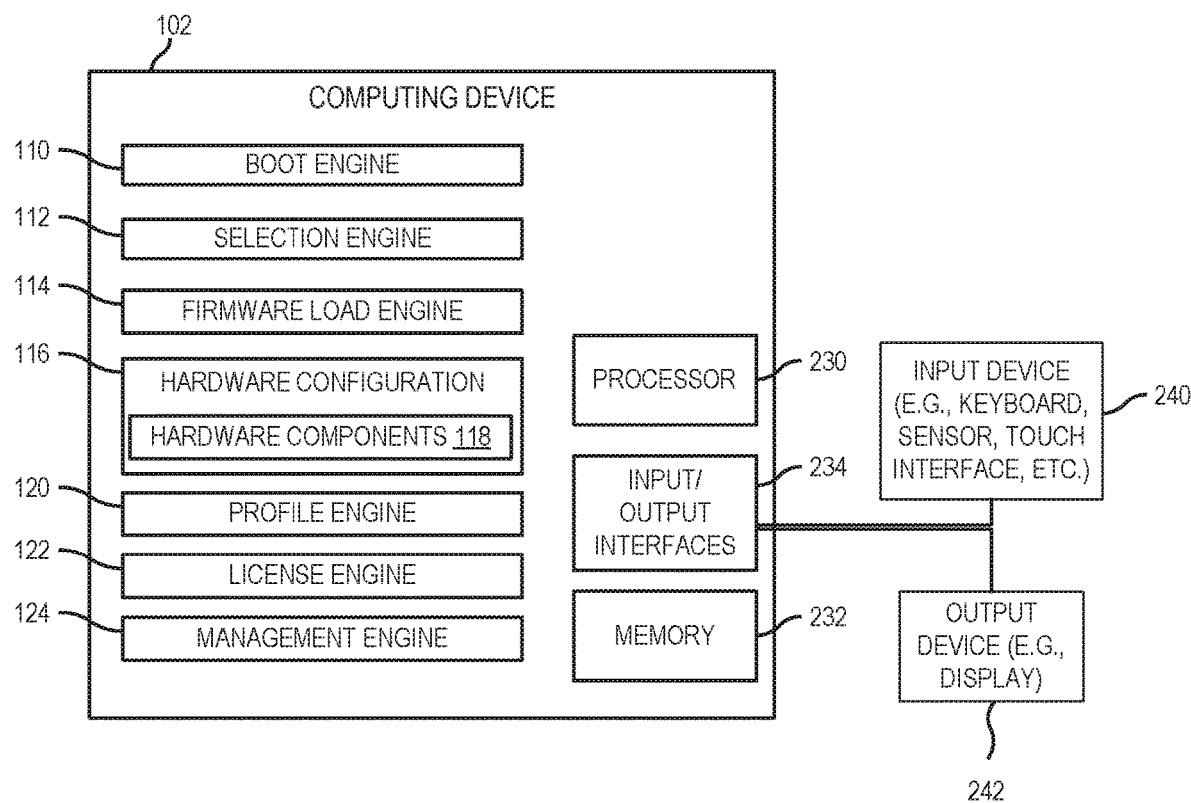
FIG. 2 is a block diagram of a computing device capable of loading firmware volumes from a memory accessible by other computing devices, according to an example.

FIG. 1 is a block diagram of a computing system including a computing device capable of loading firmware volumes from a memory accessible by other computing devices, according to an example. FIG. 2 is a block diagram of a computing device capable of loading firmware volumes from a memory accessible by other computing devices, according to an example.

In one example, computing device 102 of system 100 includes a boot engine 110, a selection engine 112, a firmware load engine 114, and a hardware configuration 116. The hardware configuration can include a number of hardware components 118. The computing device 102 can access a memory 140 that includes a plurality of firmware volumes 142 that are also available to a plurality of other computing devices 150a-150n. In some examples, as shown in FIG. 2, the computing device 102 further includes a profile engine 120, a license engine 122, a management engine 124, a processor 230, memory 232, and input/output interfaces 234. The input/output interfaces 234 can be connected to an input device 240, an output device 242, input/output devices, etc. Examples of computing devices 102, 150a-150n can include computers such as servers, blade servers, workstations, desktop computers, etc. In some examples, the computing devices 102, 150 can be part of a system 100 that uses the individual computing devices 102, 150 as nodes.

Boot engine 110 can be used to boot the computing device 102 into a state where the computing device 102 is capable of accessing memory 140. The memory 140 is available to a plurality of other computing devices 150a-150n. The memory is a persistent memory. Examples of persistent memory include memristors, phase change memory, flash memory, ferroelectric random access memory, magnetoresistive random access memory, etc. In some examples, the persistent memory can also be a main memory of at least one device of the system 100. Moreover, in some examples, the memory 140 can be made up of multiple memories. As such, some of the firmware volumes 142 can be located on one computing device and other firmware volumes located on other computing devices.

The boot engine 110 can use a SFW volume to boot the device into the state. The SFW volume can be located at a particular location in the computing device's 102 memory to load, for example, at a boot reset vector. As such, the SFW volume can be considered early crawl-out code. Similarly, in some examples the selection engine 112 and/or firmware load engine 114 can be implemented using machine executable SFW volumes located on the computing device 102. In other examples, the selection engine 112 and/or firmware load engine 114 may be implemented using machine executable SFW volumes 142. For example, in one example, a hardware capability may be implemented where the boot reset vector is remapped to memory 140, where one or more parts of boot engine 110, selection engine 112, and/or firmware load engine 114 may reside within the firmware volumes 142. In some examples, the boot engine 110, selection engine 112, and firmware load engine 114 can be implemented using a single SFW volume. In other examples, multiple SFW volumes can be used.

As noted above, memory 140 includes a plurality of firmware volumes 142. In some examples, the firmware volumes 142 are connected via a high speed connection (e.g., gigabit Ethernet). In other examples, other types of connections can be used, for example, a photonic connection. The firmware volumes 142 can include firmware volumes for use with the hardware configuration 116 of computing device 102 as well as firmware volumes for use with other hardware components. In some examples, the respective firmware volumes 142 are configured for particular components or sets of components (e.g., a processor, a processor type, a system board, encryption/decryption accelerators, video encode engines, video compression engines, physical sensors, communication devices, etc.). Further, in some examples, some of the firmware volumes 142 can also be configured for particular functionality, for example, based on a profile or license.

A selection engine 112 can be used to select a subset of the firmware volumes 142 for use with the hardware configuration 116 of computing device 102. In some examples, one firmware volume can be selected, in other examples, multiple firmware volumes can be selected. The hardware configuration 116 is a set of hardware components 118 available at the computing device 102. In one example, part of the selection process and/or boot process can include detecting hardware components 118 of the computing device 102 that make up the hardware configuration 116. In one example, hardware components 118 may respectively be associated with an order. For example, a system board with a socket for a peripheral device may be associated in the order to be initialized before the peripheral device itself. The selection engine 112 can select firmware volumes 142 to use based on the hardware configuration 116. For example, particular firmware volumes 142 may be associated to particular hardware components 118. Different firmware volumes 142 can be selected for different hardware components 118. For example, a first firmware volume can be selected for a first hardware component and a second firmware volume can be selected for a second hardware component.

A mapping can be used during the selection process. For example, a management engine 124 can be used to select associated firmware volumes 142. The management engine 124 can provide management access of the computing device 102 to an administrator (e.g., as a web page, as an application programming interface to the computing device 102, etc.). In some examples, the management engine 124 can be accessible when the computing device 102 is powered down.

In one example, the management engine 124 can be used to select firmware volumes 142 to use with the hardware configuration 116. Moreover, in one example, multiple firmware volumes can be associated with a hardware component 118. The volumes may be different based on varying factors (e.g., version number, particular licenses used to implement the firmware, a particular implementation used by a profile, etc.).

In one example, the management engine 124 can be used to choose the firmware volumes based on profiles. For example, a profile can be set for a particular function of the computing device 102 in the system 100. In one example, the computing device 102 may be associated with particular security features. As such, corresponding firmware volumes associated with implementations of the security features can be selected. In another example, computing device 102 can be associated with a particular processor 230. Corresponding firmware volumes can be selected based on the presence of the processor 230. In a further example, the computing device 102 may be used for a real-time or low-latency application suite, as such, firmware volumes associated with a low runtime execution profile can be selected. A profile engine 120 can be used to manage the use of profiles. Profile settings can be used to help select a firmware volume for a hardware component.

In another example, the presence of a license can be used for selection of the firmware volumes. For example, license engine 122 can be used to determine what licenses are present for the computing device 102. This can be implemented using, for example, tokens indicating whether particular licenses are present or another licensing scheme. In one example, the licensing scheme can include the number of processors of cores to be implemented. In another example, the licensing scheme may be used to allow usage of a portion of the hardware components, for example, by including a threshold that can be used by the computing device 102 (e.g., an Ethernet bandwidth threshold, a processing threshold, etc.). In a further example, a licensing scheme may be used to allow functionality of particular hardware components.

As such, when the computing device 102 boots, the boot engine 110 can initialize the computing device 102 to be able to communicate to memory 140. The boot engine 110 can also determine what hardware components 118 are located on the computing device 102. In some examples, the boot engine 110 can begin execution of data from memory 140 to find some of the hardware components 118. For example, the boot engine 110 can point to a memory location of an updated list of possible components. In some examples, associated firmware volumes can also be available on a data structure accessible by the computing device 102. In some examples, management engine 124 can be used to provide such a data structure locally onto the computing device 102. In other examples, the data structure can be read from the memory 140 once the memory 140 is accessible. As noted, profiles, profile settings, and/or licensing information can be used to select firmware volumes.

Firmware load engine 114 can be used to load the selected firmware volumes. In one example, a first firmware volume can be loaded for a first hardware component and a second firmware volume can be loaded for a second hardware component. In some examples, loading the firmware volume can include initializing an associated hardware component using the firmware volume. In some examples, the loading can occur directly from the memory 140.

In some examples, the firmware volumes are loaded by mapping the respective firmware volumes to a memory address associated with firmware for the computing device 102. Moreover, the memory 140 may be accessible to the computing device 102 and/or the other computing devices 150 as a fabric-attached memory. A fabric-attached memory is a memory subsystem attached to the computing device 102 and/or the other computing devices 150 through a high speed network, for example, via a photonic connection.

In one example, a firmware volume used by the computing device 102 is updated. The firmware volume can be updated remotely, that is, by a device other than the computing device 102, such as one of the other computing device 150 or using another remote management approach. In one example, when the volume is updated, a volume management system can be used to let management engines on computing devices know of the update via a message. Various approaches can be used, for example, a publisher/subscriber approach, using a list, etc. As such, in the example, when the firmware volume is updated, a message indicating the update is sent to the management engine 124. The management engine 124 can then cause the firmware load engine 114 to re-load the updated firmware volume. In some examples, a reboot is not necessary to update the firmware volume used. Moreover, in some examples, the firmware volumes can be individually updated. In other examples, a message need not be sent, but instead the updated firmware volume can be implemented the next time the computing device 102 boots.

The system 100 can include a computing device 102 that communicates with other devices via a communication network (e.g., via a input/output interface 234). In certain examples, the devices can be computing devices, such as servers, client computers, desktop computers, mobile computers, etc. In other examples, the devices can include special purpose machines. The device may be implemented via a processing element, memory, and/or other components.

The communication network can use wired communications, wireless communications, or combinations thereof. Further, the communication network can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network can be in the form of a direct network link between devices. Various communications structures and infrastructure can be utilized to implement the communication network(s).

By way of example, the devices communicate with each other and other components with access to the communication network via a communication protocol or multiple protocols. A protocol can be a set of rules that defines how nodes of the communication network interact with other nodes. Further, communications between network nodes can be implemented by exchanging discrete packets of data or sending messages. Packets can include header information associated with a protocol (e.g., information on the location of the network node(s) to contact) as well as payload information. System 100 can connect one or more computing devices 102, 150 to the communication network to provide communications to other devices. This can enable use of the system for various purposes, for example, database use, web site serving, etc.

The engines 110, 112, 114, 120, 122, 124 include hardware and/or combinations of hardware and programming to perform functions provided herein. Moreover, the modules (not shown) can include programming functions and/or combinations of programming functions to be executed by hardware as provided herein. When discussing the engines and modules, it is noted that functionality attributed to an engine can also be attributed to the corresponding module and vice versa. Moreover, functionality attributed to a particular module and/or engine may also be implemented using another module and/or engine. As noted above, some of the engines can be implemented as hardware executing firmware volumes.

A processor 230, such as a central processing unit (CPU) or a microprocessor suitable for retrieval and execution of instructions and/or electronic circuits can be configured to perform the functionality of various engines and modules described herein. In certain scenarios, instructions and/or other information, such as address information of firmware volumes, can be included in memory 232 or other memory. Input/output interfaces 234 may additionally be provided by the computing device 102. For example, input devices 240, such as a keyboard, a sensor, a touch interface, a mouse, a microphone, etc. can be utilized to receive input from an environment surrounding the computing device 102. Further, an output device 242, such as a display, can be utilized to present information to users. Examples of output devices include speakers, display devices, amplifiers, etc. Moreover, in certain examples, some components can be utilized to implement functionality of other components described herein. Input/output devices such as communication devices like network communication devices or wireless devices can also be considered devices capable of using the input/output interfaces 234.

Figure 3:
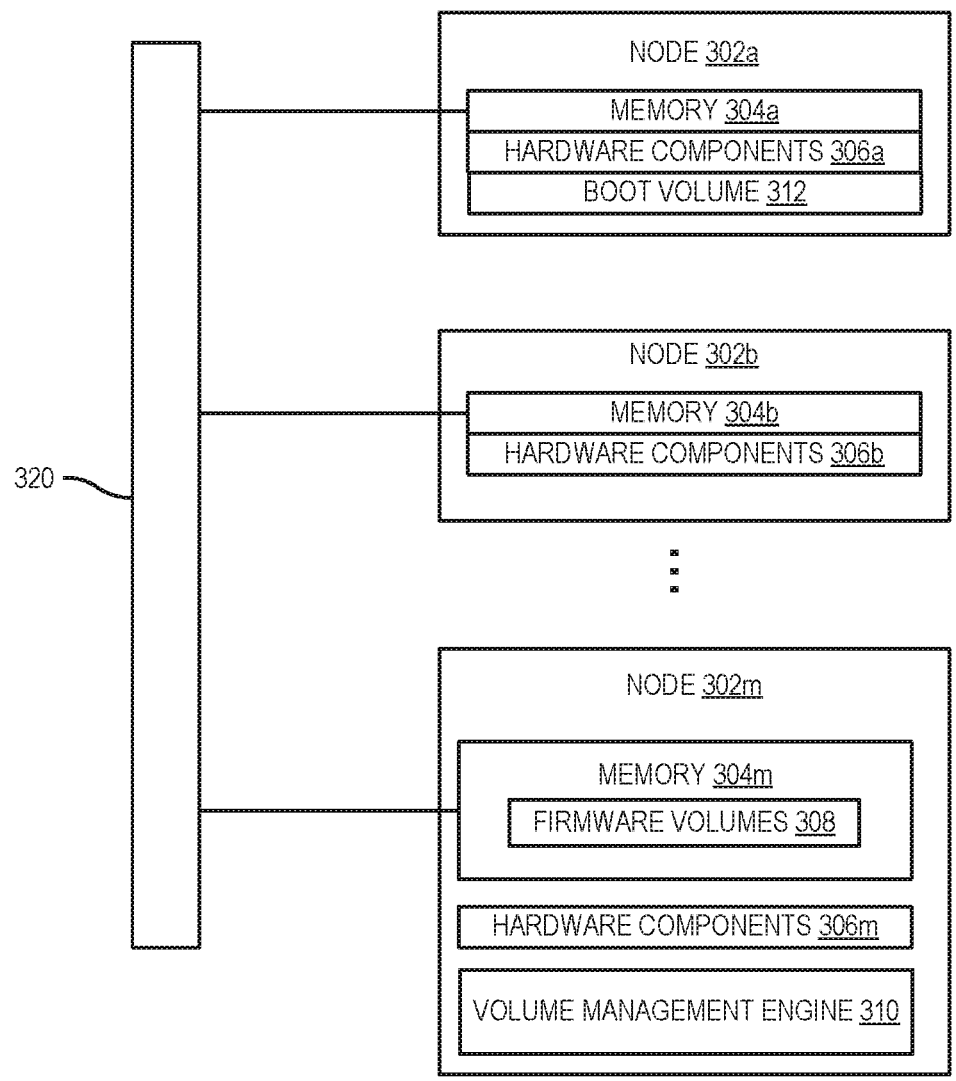
FIG. 3 is a block diagram of a system including nodes capable of selecting firmware volumes to load based on hardware components of the respective nodes, according to an example.

FIG. 3 is a block diagram of a system including nodes capable of selecting firmware volumes to load based on hardware components of the respective nodes, according to an example. System 300 can include a number of nodes 302a, 302b-302m. The respective nodes can include respective memory 304a, 304b-304m and respective hardware components 306a, 306b-306m. Memory 304 of the nodes can be interconnected using a fabric 320. The fabric 320 can be implemented as a high speed connection, such as a photonic connection. Further, in one example, the memory 304 may be a direct load memory via the fabric 320. A direct load memory is a memory that allows certain hardware access to a main system memory (e.g., memory 304) independently of a central processing unit.

In certain examples, firmware volumes 308 can be accessible by the nodes via the fabric 320. Further, one or more of the nodes 302 can use the firmware volumes 308 to load selected firmware onto the respective hardware components 306. FIG. 3 shows the firmware volumes 308 located on node 302m, however, it is intended that firmware volumes 308 can be located on the node 302m, on multiple nodes as redundancy, and/or split among multiple nodes.

In some examples, some of the nodes, for example, node 302a can include a boot volume 312 that include early initialization code that can be executed by hardware. The boot volume 312 can be small and include enough functionality to initialize the node 302 to a state where the node 302a can access the firmware volumes 308 (e.g., using the fabric 320).

Using the boot volume 312, the node 302 can determine the hardware components 306a (e.g., by scanning for hardware, using a data structure from a management system of the node 302, etc.). The node 302a can then select a subset of the firmware volumes 308 to implement (e.g., by executing the respective firmware volumes) on the node 302a based on the determined hardware. In some examples, the subset is also based on a profile as discussed above. Further, some of the firmware volumes can be selected based on a license as discussed above.

The node 302a can load the selected firmware volumes for the hardware components 306a. As noted above, other nodes can similarly use the firmware volumes 308. In one example, node 302b can include hardware components 306b that are in the same hardware configuration as hardware components 306a, but different firmware volumes are selected. In this case, a profile for node 302b can be different. As such, the selected subset of firmware volumes to implement are different.

In one example, a firmware update to a firmware volume can occur using the volume management engine 310 and/or new firmware volumes can be added. In one example, when a new volume is compiled, the volume can be added to a firmware repository including the firmware volumes. Further, the volume management engine 310 may associate the firmware volume with one or more profiles, profile settings, licenses, hardware configurations, etc. A notification can be sent to nodes using the firmware volume, for example, node 302*a*. Node 302*a* can then begin using the new firmware volume. In some examples, a reboot is not needed and the firmware volume can be implemented on the fly. In other examples, the new firmware volume can be used after a reboot. Though volume management engine 310 is shown in node 302*m*, firmware management engine 310 may be located in another device, such as one of the other nodes with access to memory 304*m* or an external device capable of updating the firmware volumes.

In some examples, the firmware update to the firmware volumes or addition of new firmware volumes can occur remotely from the node consuming the firmware volume. In some examples, the volume management engine 310 is used to perform the update. In other examples, the new firmware volume can be built and uploaded remotely from the node 302*m*.

Moreover, the volume management engine 310 can be used to manage the firmware volumes 308. For example, certain firmware volumes associated with a particular stage of production or revision of a machine is made, the respective firmware volumes can be tracked and protected. In one example, the firmware volumes can be associated with a particular type of node (e.g., web server node in a particular configuration). The firmware volumes can be tagged as such and protected (e.g., marked read only). Moreover, firmware volumes can be backed up. Moreover, the volume management engine 310 may generate an index of the firmware volumes 308. The index can be sent to the nodes 302 during boot up to facilitate loading of the firmware volumes.

For example, the index can be kept at a particular memory location that the respective nodes read during execution of a boot volume 312. When firmware volumes are selected, the location of the firmware volume in the memory 304*m* can be determined from the index. In some examples, this type of interaction can take place with a management subsystem of the nodes instead of during the boot process. In some examples, the index (or other data structure) can include which firmware volume to use for respective hardware components, profile, license, or a combination thereof. In some examples, a profile may limit the code base to a particular set (e.g., default). In other examples, the profile may indicate that the node should run the latest firmware volume. Similarly, the profile may indicate whether a stable build or beta build is can be used. For example, a set of test nodes can have a profile that uses beta builds while a set of production nodes have a profile that uses production tested builds of the firmware volumes.

In one example, because the respective nodes need not include all of the firmware volumes, but instead use a boot volume 312, nodes can be manufactured and shipped with a final boot volume. Thus, the majority of the firmware need not be finalized when the nodes are manufactured. The firmware volumes can be finalized and added to the system 300 at a later time than manufacturing. This is advantageous compared to a single monolithic firmware image that would traditionally be required to be complete before manufacturing and boxing of computing devices.

In some examples, the volume management engine 310 can push selected firmware volumes for a particular node (e.g., node 302*a*) to the node 302*a* for loading. In one example, during boot or before boot, the node 302*a* (e.g., via a management engine or via a process in a boot engine) can provide the volume management engine 310 with information about the hardware components 306*a* and/or profile information and/or license information. The volume management engine 310 uses the received information to select firmware volumes to load for the hardware components. As noted above, the selection can be based on the hardware components, the profile information, the license information, or a combination thereof. The selected firmware volumes can be loaded onto the node 306*a*, for example, by pushing the selected firmware volumes to local memory 304*a* of node 302*a*. In some examples, the local memory 304*a* is also accessible by other nodes. Moreover, the volume management engine 310 can cause loading of the firmware volumes for multiple ones of the nodes of the system 300.

In some examples, the nodes can execute the selected firmware volumes from local memory during boot. For example, the volume management engine 310 can select a subset of firmware volumes 308 for node 302*b* based on hardware components 306*b*, profile information, license information, or a combination thereof. The subset of firmware volumes can be provided to memory 304*b*. Node 302*b* can then execute the selected subset of firmware volumes. In one example, node 304*b* can include the same hardware configuration of hardware components, but load and execute a different subset of firmware volumes. This can be based, for example, on a profile.

Figure 4:
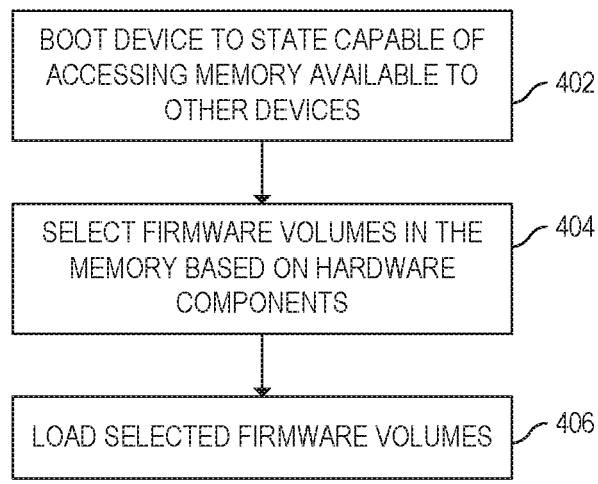
FIG. 4 is a flowchart of a method for a computing device to load selected firmware volumes from a memory located at another computing device, according to an example.
Figure 5:
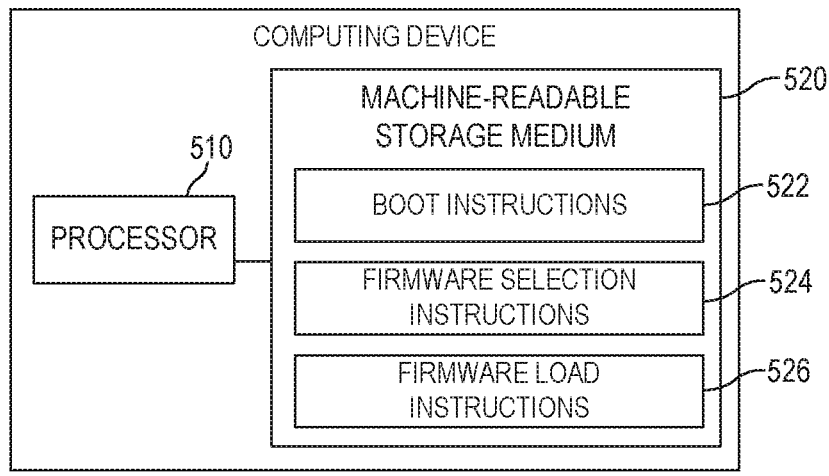
FIG. 5 is a block diagram of for a computing device to load selected firmware volumes from a memory located at another computing device, according to an example.

FIG. 4 is a flowchart of a method for a computing device to load selected firmware volumes from a memory located at another computing device, according to an example. FIG. 5 is a block diagram of for a computing device to load selected firmware volumes from a memory located at another computing device, according to an example. Although execution of method 400 is described below with reference to computing device 500, other suitable components for execution of method 400 can be utilized (e.g., computing device 102). Method 400 may be implemented in the form of executable instructions stored on a machine-readable storage medium, such as storage medium 520, and/or in the form of electronic circuitry. Some of the instructions can be in the form of a local firmware volume.

The computing device 500 includes, for example, a processor 510, and a machine-readable storage medium 520 including instructions 522, 524, 526 for booting the computing device 500 to a state where the computing device can access and load firmware volumes from a memory located at another device. In certain examples, the memory can be non-volatile. Further, in some examples, the memory can be part of a main memory of the other device. The memory can be connected, for example, by a fabric. Computing device 500 may be, for example, a server, a workstation, a desktop computer, a thin client, etc.

Processor 510 may be, at least one central processing unit (CPU), at least one semiconductor-based microprocessor, at least one graphics processing unit (GPU), other hardware devices suitable for retrieval and execution of instructions stored in machine-readable storage medium 520, or combinations thereof. For example, the processor 510 may include multiple cores on a chip, include multiple cores across multiple chips, multiple cores across multiple devices (e.g., if the computing device 500 includes multiple node devices), or combinations thereof. Processor 510 may fetch, decode, and execute instructions 522, 524, 526 to implement method 400 as well as additional functionality. As an alternative or in addition to retrieving and executing instructions, processor 510 may include at least one integrated circuit (IC), other control logic, other electronic circuits, or combinations thereof that include a number of electronic components for performing the functionality of instructions 522, 524, 526.

Machine-readable storage medium 520 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 520 may be encoded with a series of executable instructions for loading selected firmware volumes.

At 402, the processor 510 can execute the boot instructions 522 to initialize the computing device 500 and boot the computing device 500 to a state where the device is capable of accessing a memory available to multiple other computing devices. The memory can be located at one of the other computing devices and connected via a fabric as described above. Moreover, in some examples, the memory can be a main memory for that device. Further, the memory can be a non-volatile memory. In certain examples, computing device 500 is initialized to be able to directly address the memory. During initialization, the computing device 500 can detect hardware components of the computing device 500.

The detected hardware components can be used to select firmware volumes to load for the computing device 500. At 404, firmware volumes can be selected based on the hardware components, for example, by executing firmware selection instructions 524. As noted above, the firmware volumes can also be selected based on a profile and/or a license. At 406, the firmware load instructions 526 can be executed to load the selected firmware volumes. In one example, the firmware can be loaded by mapping the firmware volume or copying parts of the firmware volume for one of the hardware components to a memory (e.g., a volatile or non-volatile memory) used by the hardware component.

In some examples the determination of the hardware components, selection of firmware volumes, and loading of the firmware volumes can be rolling. For example, the processor 510 can detect a system board, select a firmware volume for the system board, and load the firmware volume for the system board. Then, the processor 510 can detect a peripheral device attached to the system board, select a firmware volume for the peripheral device, and load the firmware volume.

As noted above, one or more of the firmware volumes located on the memory can be updated (e.g., updated by a remote system). The location of the updated firmware can be provided to the computing device 500. The computing device 500 can then load the updated firmware from the memory. In some examples, the load can occur without rebooting of the computing device 500. In some examples, the boot instructions 522, the firmware selection instructions 524, and/or the firmware load instructions 526 can be part of an initial local firmware volume.

What is claimed is:

1. A computing device comprising:
    a boot engine to boot the computing device to a state where the computing device is capable of accessing a memory available to a plurality of other computing devices,
      wherein the memory includes a plurality of firmware volumes;
    a plurality of hardware components;
    a license engine to determine a license for usage of one of the hardware components;
    a selection engine to select at least one of the firmware volumes based on a hardware configuration of the computing device and the license; and
    a firmware load engine to load the at least one firmware volume.

2. The computing device of claim 1,
    wherein a first one of the firmware volumes is loaded for a first one of the hardware components, and
    wherein a second one of the firmware volumes is loaded for a second one of the hardware components.

3. The computing device of claim 1, further comprising:
    a profile engine to determine a profile including a plurality of settings for the hardware configuration,
    wherein the selection engine is further to select the at least one firmware volume based on the settings.

4. The computing device of claim 1, wherein the at least one firmware volume is loaded by mapping the at least one firmware volume to a memory address associated with firmware for the computing device and wherein the memory is persistent and the memory is accessible via a memory fabric to each of the other computing devices.

5. The computing device of claim 1, further comprising:
    a management engine,
    wherein the at least one firmware volume is updated,
    wherein the management engine receives a message indicating that the at least one firmware volume was updated, and
    wherein the firmware load engine re-loads the updated at least one firmware volume.

6. The computing device of claim 5, further wherein the management engine is further to set a location of the at least one firmware volume.

7. A non-transitory machine-readable storage medium storing firmware instructions that, if executed by at least one processor of a device, cause the device to:
    boot the device to a state where the device is capable of accessing a memory available to a plurality of other computing devices and located remote from the device,
      wherein the memory includes a plurality of firmware volumes;
    determine a license for usage of one of a plurality of hardware components of the device;
    select at least one of the firmware volumes based on the plurality of hardware components of the device and the license; and
    load the selected firmware volumes.

8. The non-transitory machine-readable storage medium of claim 7, further comprising firmware instructions that, if executed by the at least one processor, cause the device to:
    detect the hardware components;
    map a first one of the firmware volumes for a first one of the hardware components to a non-volatile memory of the device.

9. The non-transitory machine-readable storage medium of claim 7, further comprising firmware instructions that, if executed by the at least one processor, cause the device to:
    determine a profile including a plurality of settings for the hardware components,
    wherein selection of the at least one firmware volume is further based on the profile.

10. The non-transitory machine-readable storage medium of claim 8, further comprising firmware instructions that, if executed by the at least one processor, cause the device to:
    receive a location of an updated firmware volume for the at least one firmware volume;
    use the updated firmware volume in place of the at least one firmware volume.

11. A system comprising:

a plurality of nodes;

a plurality of firmware volumes accessible by the plurality of nodes via fabric attached memory, wherein one of the nodes includes a plurality of hardware components, wherein the firmware volumes are located external to the one node, wherein a subset of the firmware volumes are selected to load for the one node based on the hardware components, a profile, and a license for usage of one of the hardware components;

wherein the one of the nodes is to:

execute the selected firmware volumes for the hardware components.

12. The system of claim 11, wherein a second one of the nodes includes a plurality of other hardware components in a same hardware configuration as the one node, wherein a second plurality of firmware volumes are selected for the other hardware components based on a second profile, wherein the second one node is further to:

execute the second selected firmware volumes, wherein the second selected firmware volumes are different from the selected firmware volumes.

* * * * *